Figure 1:
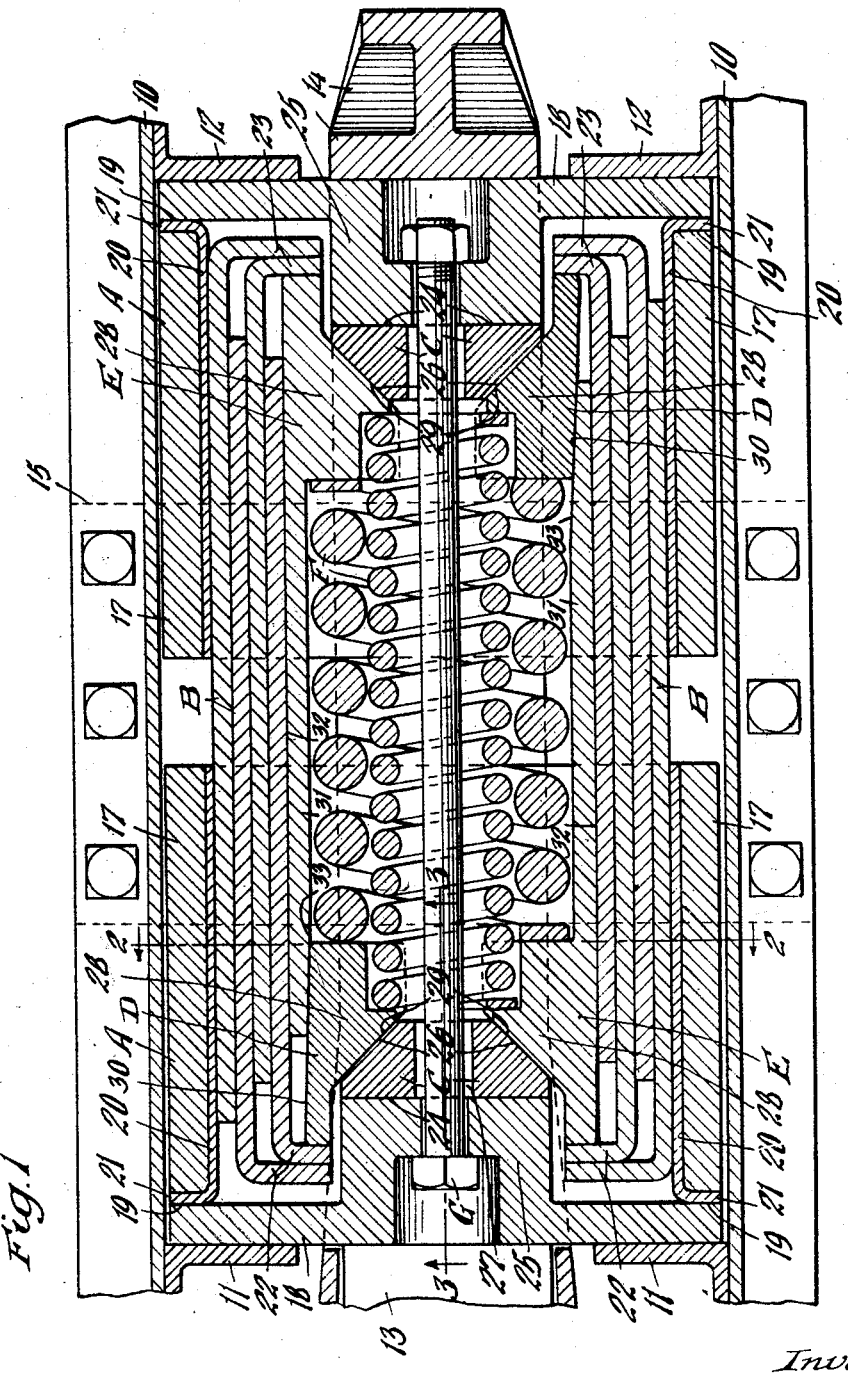

Jan. 13, 1931.    J. F. O'CONNOR    1,788,540
FRICTION SHOCK ABSORBING MECHANISM
Filed April 14, 1928    2 Sheets-Sheet 1

Witness
Wm. Geiger

Inventor
John F. O'Connor
By Joseph Harris
His Atty.

Jan. 13, 1931.  J. F. O'CONNOR  1,788,540
FRICTION SHOCK ABSORBING MECHANISM
Filed April 14, 1928   2 Sheets-Sheet 2
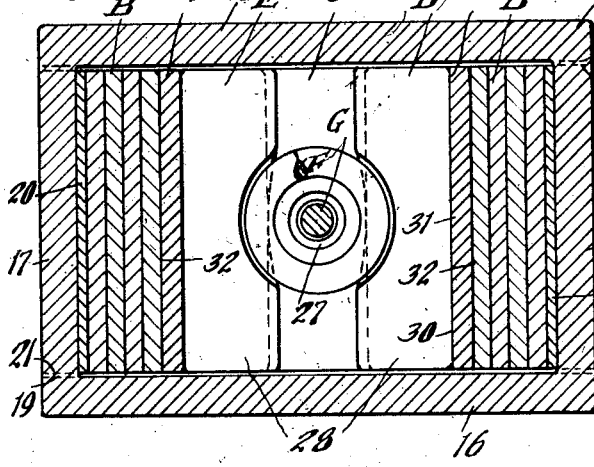
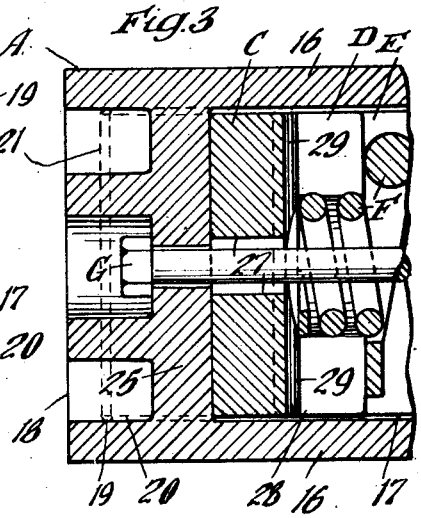
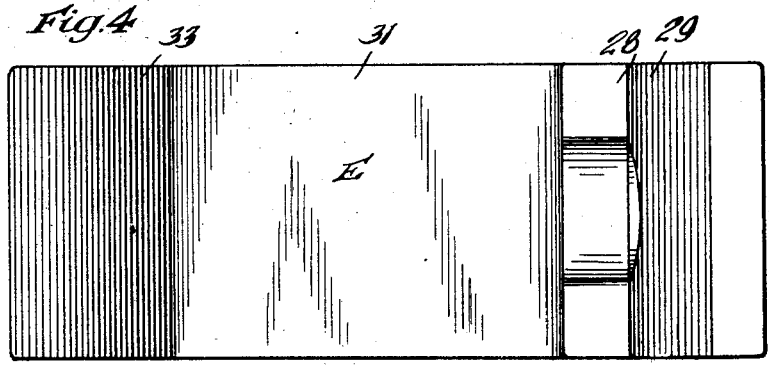
Witness
Wm. Geiger
Inventor
John F. O'Connor
By Joseph Harris
His Atty Patented Jan. 13, 1931

1,788,540

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK-ABSORBING MECHANISM

Application filed April 14, 1928. Serial No. 269,933.

This invention relates to improvements in friction shock absorbing mechanisms.

The main object of this invention is to provide a friction shock absorbing mechanism especially adapted to railway draft riggings of the intercalated friction plate type, including two groups of friction plates disposed at opposite sides of the mechanism and held against lateral outward movement, co-operating with friction shoes and wedge means which are spring resisted and interposed between the two groups of friction plates, wherein the friction shoes are disposed in sets at opposite ends of the mechanism and one of the shoes of each set has friction means thereon co-operating with friction means of the shoe of the other set which is disposed at the same side of the mechanism, and wherein the co-operating friction surfaces of said shoes are inclined with respect to the longitudinal axis of the mechanism to provide for differential action to increase the movement of the parts and the compression of the main spring resistance, thereby providing a gear of high shock absorbing capacity.

Other and further objects of the invention will more clearly appear from the description and claims hereinafter following.

In the drawings, forming a part of this specification, Figure 1 is a longitudinal, horizontal sectional view through the underframe structure of a railway car, illustrating my improvements in connection therewith. Figure 2 is a vertical, transverse sectional view of the shock absorbing mechanism proper, corresponding substantially to the line 2—2 of Figure 1. Figure 3 is a longitudinal vertical sectional view of the front end portion of my improved shock absorbing mechanism, corresponding substantially to the line 3—3 of Figure 1. And Figure 4 is a detailed, side, elevational view of a friction shoe employed in connection with my improved mechanism.

In said drawings, 10—10 indicate channel-shaped center or draft sills of a railway draft rigging, having the usual front stop lugs 11—11 and rear stop lugs 12—12 secured to the inner sides thereof. The inner end portion of the drawbar of the railway draft rigging is indicated by 13, and a yoke 14 of well known form is secured thereto. The yoke supports therewithin my improved shock absorbing mechanism, hereinafter more fully described, and the yoke in turn is supported by a detachable saddle plate 15 secured to the lower flanges of the draft sills by bolts.

My improved shock absorbing mechanism comprises, broadly, front and rear friction shells or casings A—A, two groups of friction plates B—B, front and rear wedge blocks C—C, two friction shoes D—D and two friction shoes E—E, a main spring resistance F, and a retainer bolt G.

The front and rear friction shells A are of similar design, each being in the form of a substantially rectangular box-like casing having spaced, horizontally disposed top and bottom walls 16—16, spaced, longitudinally disposed side walls 17—17, and a transverse outer end wall 18. The end wall 18 of each casing cooperates with the corresponding stop lugs of the draft sills in the manner of the usual corresponding main follower.

The side walls of the casings are provided with vertically disposed seats or openings 19, extending therethrough, the openings being disposed adjacent the end wall of the casing or shell. The side walls 17 are provided with liners 20 which cooperate with the two groups of friction plates. Each liner 20 is in the form of a substantially rectangular plate extending from end to end of the side wall of the shell and equal in height to the interior height of said wall. At the outer end, the plate 20 is provided with a laterally out-turned flange 21, which is seated in the corresponding opening 19, thereby maintaining the liner against longitudinal displacement with respect to the shell.

The two groups of friction plates B are arranged at opposite sides of the mechanism and each group includes two sets of relatively movable plates. As clearly shown in Figure 1, the plates of one set are alternated with the plates of the other set, and the plates of one set have laterally inwardly extending flanges 22 at the forward ends thereof, while the plates of the other set have similar laterally inwardly extending flanges 23 at the rear ends thereof.

As illustrated in the disclosure of my invention, each set of plates of the two groups comprises two plate members, although it will be evident that a greater number of plates may be employed in connection with each set if desired. The flanges of the plates of each set overhang each other and the corresponding friction shoe at the same side of the mechanism, whereby upon outward movement of the friction shoe the plates are also moved outwardly to restore the same to the normal position.

The ends of the plates opposite to the inturned flanges are spaced such a distance from the flanges in the normal position of the parts that full compression and the necessary relative movement of the plates is permitted during a compression stroke, without the plates engaging the flanges. The flanged ends of the plates are spaced from the corresponding end walls 18 of the front and rear friction shells a predetermined distance, as shown, so as to permit of a certain amount of preliminary action of the shock absorbing mechanism before the plates are engaged by the walls of the friction shells and moved relatively to each other.

The wedge blocks C, which are disposed at opposite ends of the mechanism, are identical in design. Each wedge block has a flat transverse abutment face 24 which bears on an inwardly extending boss 25 on the end wall 18 of the corresponding friction casing. Each wedge block is provided with a pair of wedge faces 26—26 at the inner end thereof, co-operating with the corresponding friction shoes. Each block is also provided with a central opening 27 to accommodate the corresponding end of the retainer bolt G, the opening being larger than the shank of the bolt so that a certain amount of lateral displacement of the wedge block is permitted.

The friction shoes are arranged in pairs at opposite ends of the mechanism, each pair comprising a shoe D and a shoe E. The shoes D and E are of similar design, except as hereinafter pointed out. Each shoe is provided with a lateral inward enlargement 28 having a wedge face 29 at the outer side thereof, adapted to co-operate with the corresponding wedge face 26 of the wedge block C. The shoe D of each set is provided with a longitudinally disposed inclined surface 30 on the outer side thereof, which co-operates with the friction means of the friction shoe E of the set at the other end of the mechanism, as hereinafter pointed out.

Each shoe is extended forwardly beyond the wedge face 29 thereof and bears on the in-turned flange of the adjacent friction plate at the corresponding end of the mechanism.

Each friction shoe E is provided with an inwardly extending integral plate-like section 31 of substantially rectangular form. The plate-like section 31 and the shoe proper are provided with a longitudinally disposed flat friction surface 32 on the outer side thereof, which co-operates with the friction surface of the innermost plate of the corresponding group B. On the inner side, the free end portion of the plate-like section 31 of each shoe E is provided with a flat friction surface 33 which co-operates with the friction surface 30 of the friction shoe D at the opposite end and at the same side of the mechanism.

The main spring resistance F comprises a light inner coil and a heavier outer coil, having their opposite ends bearing on the inner ends of the front and rear sets of friction shoes D and E, the inner coil extending beyond the inner ends of the shoes and bearing on transverse abutment shoulders at the inner ends of the enlargement of the shoes. The spring resistance is preferably placed under initial compression so that the shoes will be normally urged outwardly, thereby compensating for wear of the various friction and wedge faces of the mechanism.

The mechanism is held assembled and of overall uniform length by the retainer bolt B, which extends through the inner coil of the spring resistance and aligned openings in the front and rear bosses of the friction shells, and has the head thereof anchored to one of said bosses and a nut to the other boss. As hereinbefore pointed out, the openings in the wedge blocks which accommodate the retainer bolt are of sufficient size to allow for a certain amount of lateral movement of the wedge blocks without obstruction by the retainer bolt.

The operation of my improved shock absorbing mechanism, assuming a compression stroke, is as follows: The front and rear follower casings and friction shells A are moved relatively toward each other, thereby forcing the wedge blocks C toward each other also and setting up a wedging action between the same and the corresponding set of friction shoes D and E. In addition to setting up the wedging action, the shoes will also be forced inwardly of the mechanism. The spreading action effected by the wedge blocks C places the two groups of friction plates under lateral pressure, thereby bringing the friction surfaces thereof into intimate contact and also pressing the outermost friction plates against the friction surfaces of the liners of the friction shells. During the first part of the compression stroke, there will be no substantial movement of the friction plates of the two sets of each group with respect to each other. When the clearance between the end walls 18 of the friction shells and the outer ends of the plates has been taken up, the plates of one set will be carried inwardly of the mechanism with respect to the plates of the other set, thereby greatly augmenting the frictional resistance of the mechanism. As the friction shoes of the pair at one end of the mechanism approach the friction shoes at the other end, the friction shoes of each pair will be forced laterally toward each other, due to the inclined relation of the cooperating friction surfaces of the shoes D and the plate-like sections 31 of the shoes E. A differential action will thus be set up, thereby causing the friction shoes D and E to slip on the wedge faces of the wedge blocks C and effecting a more rapid movement of the shoes longitudinally of the mechanism than of the corresponding wedge block. Inasmuch as the shoe of each pair which has the differential action is located at one side of the mechanism, lateral movement of the wedge block C must be accommodated, and for this purpose the opening for the bolt is of larger size than the diameter of the bolt, as hereinbefore pointed out. The action at each end of the mechanism during the differential movement is as follows: The wedge block D will be moved laterally toward the wedge block E, thereby causing slippage on the wedge faces 26 and 29, and also forcing the wedge block C laterally toward the wedge block E. The wedge block E will slip on the wedge face of the wedge member and be forced inwardly of the mechanism.

The described action of the mechanism will continue either until relative approach of the friction shells A is limited by engagement of the inner ends thereof with each other, or the actuating force is reduced.

In release, when the actuating force is reduced, the expansive action of the main spring resistance will restore the friction shoes to their normal position. The wedge blocks will be carried outwardly with the shoes and in turn will carry the friction plates to their normal position by engagement with the flanges 22 and 23. The outward movement of the friction casings or shells A is positively limited by the retainer bolt, thus limiting the outward movement of the wedge blocks C and friction shoes also.

Release of the mechanism is facilitated, due to the friction plates being actuated after a certain amount of initial compression of the mechanism, because the friction shoes are moved out of engagement with the flanges 22 and 23 of the plates during this initial movement, thereby permitting outward movement and release of the wedge system before the friction plates are actually engaged and moved outwardly.

While I have herein shown and described what I consider the preferred manner of carrying out my invention, the same is merely illustrative and I contemplate all changes and modifications which come within the scope of the claims appended hereto.

I claim:

1. In a friction shock absorbing mechanism, the combination with front and rear relatively movable follower elements; of front and rear wedge members movable with said follower elements; front and rear sets of friction shoes cooperating with said wedge members, one shoe of each set having a longitudinally extending plate-like section formed integral therewith, said plate-like section having a tapered end having frictional engagement with the shoe of the other set at the same side of the mechanism, spring resistance means opposing relative movement of said front and rear sets of shoes; two groups of friction plates disposed on opposite sides of the mechanism and having frictional engagement with the plate-like sections of the shoes; and means exterior to said groups of plates opposing lateral outward movement of the same.

2. In a friction shock absorbing mechanism, the combination with front and rear friction shells having longitudinally disposed, opposed, interior friction surfaces, said shells being movable relatively toward and away from each other; of front and rear wedge blocks movable with said shells; front and rear pairs of friction shoes disposed at opposite sides of said wedge members and having wedging engagement therewith, one shoe of each pair having a friction plate section formed integrally therewith and having frictional engagement with the shoe of the other pair at the corresponding side of the mechanism, the co-operating friction surfaces of said last-named shoe and friction plate section being inclined to the longitudinal axis of the mechanism to provide for differential action; spring resistance means interposed between said shoes; two groups of friction plates disposed at opposite sides of the mechanism, the plates of said groups being intercalated and relatively movable with respect to each other upon relative movement of said friction shells, the innermost plates of said groups having frictional engagement with the friction plate sections of the shoes and the outermost plates of said groups having frictional engagement with the shell friction surfaces.

In witness that I claim the foregoing I have hereunto subscribed my name this 12th day of April, 1928.

JOHN F. O'CONNOR.